R. REID.
PULLEY.
APPLICATION FILED JULY 10, 1911.
1,033,934.
Patented July 30, 1912.
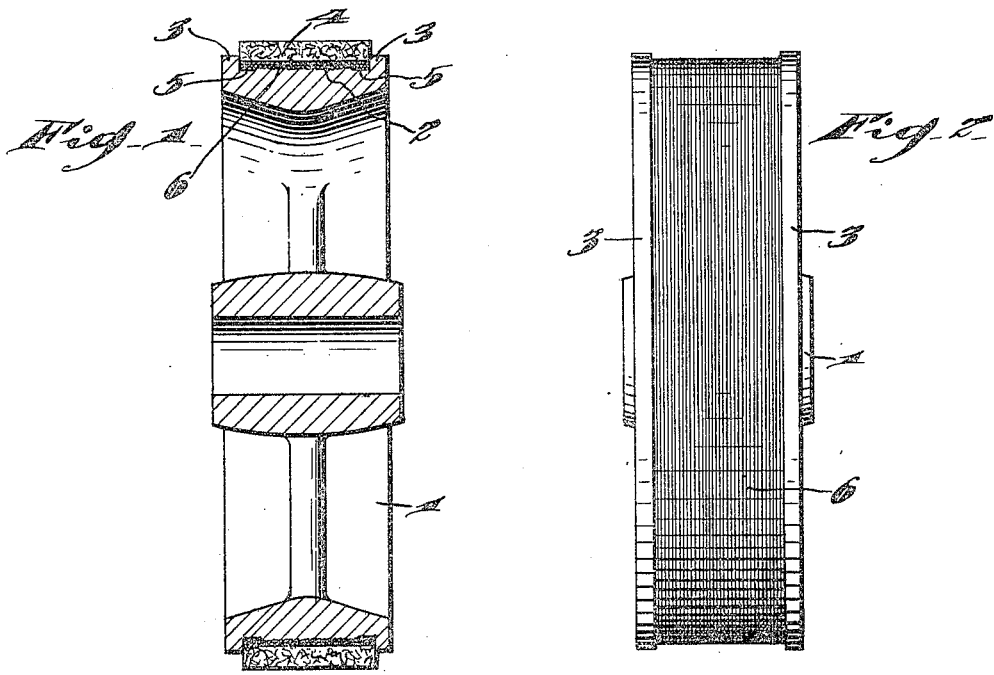
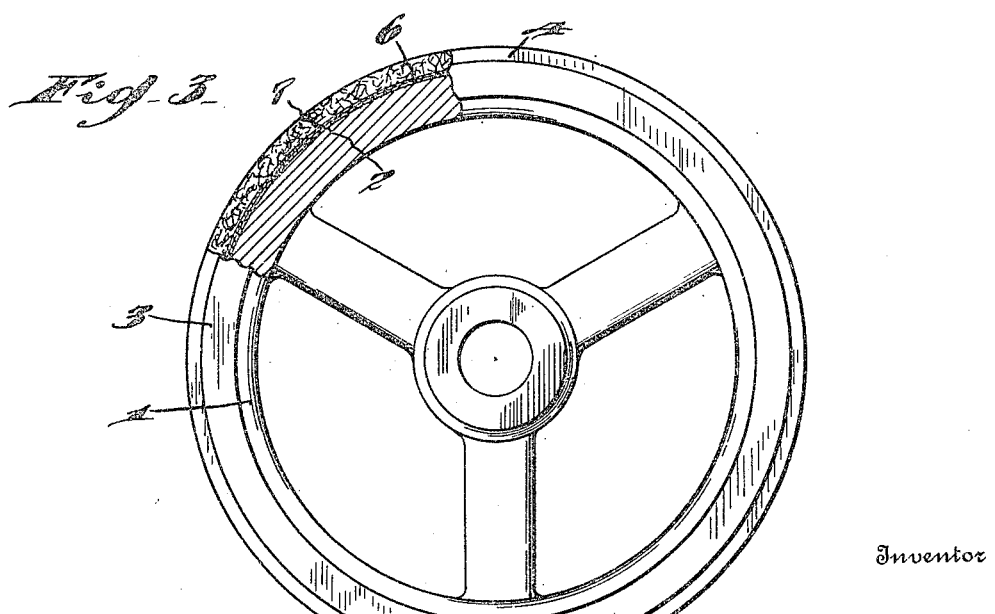

UNITED STATES PATENT OFFICE.

ROBERT REID, OF PHILADELPHIA, PENNSYLVANIA.

PULLEY.

1,033,934.  Specification of Letters Patent.  Patented July 30, 1912.

Application filed July 10, 1911. Serial No. 637,645.

*To all whom it may concern:*

Be it known that I, ROBERT REID, a citizen of the United States, residing at Philadelphia, in the county of Philadelphia and State of Pennsylvania, have invented certain new and useful Improvements in Pulleys, of which the following is a specification.

My invention relates to improvements in pulleys, and more particularly to improved tires for pulleys and means for securing the tires on the pulleys, whereby a secure juncture is had between the leather or other tire, and the metal pulley, so that the tire does not work loose or slip on the pulley.

A further object is to provide a pulley of this kind which is especially designed for use in connection with woolen mills where the pulley tire receives an excessive strain, and where it is liable to slip or work loose from the pulley.

With these and other objects in view, the invention consists in certain novel features of construction and combinations and arrangements of parts, as will be more fully hereinafter described and pointed out in the claim.

In the accompanying drawings: Figure 1, is a view in cross section illustrating my improvements. Fig. 2, is a view in elevation of the pulley before the leather tire is placed thereon, and Fig. 3, is a view in side elevation partly in longitudinal section.

1, represents a metal pulley, which is provided in its periphery with a circumferential groove 2 forming parallel flanges 3 between which the leather tire 4 is secured. Groove 2, at its side edges, adjacent the flanges 3, is deepened as shown at 5. In the grooves 2 and 5, a cord 6 is wound under tension. The deepened portions or grooves 5 constitute receptacles in which more than a single thickness of the cord is wound, so that a firmer grip is had upon the pulley. Furthermore the surface of the grooved portion 2 is roughened or grooved circumferentially, so that the cord as it is wound tightly, grips the surface. It is to be understood that the cord is wound around and around the pulley until the entire surface of the grooved portion 2 is covered with an approximately smooth surface of cord. This surface of cord is then covered with adhesive, such for example as cement or glue, and the leather tire 4 tightly clamped thereon, the meeting edges of the tire being preferably butt end to end as shown at 7 and glued together. By reason of this winding of cord, the glue obtains a hold upon the cord and upon the leather, and securely binds the leather to the pulley, which produces a far superior tire than would be the result if the tire were glued directly to the leather, which is the customary way of making pulleys of this type.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

As a new article of manufacture, a pulley comprising a metal body having a circumferential groove, a circular tire of flexible material, and a winding of cord wound tight around the pulley in the circumferential groove thereof, adhesive material interposed between the winding and the tire, whereby the tire is secured to the cord, said circumferential groove deepened at its outer edges, and a plurality of windings of said cord positioned in said deepened portions of the grooves, whereby the outer surface of said windings are smooth, substantially as described.

In testimony whereof I have signed my name to this specification in the presence of two subscribing witnesses.

ROBERT REID.

Witnesses:
  WILLIAM MOIR,
  R. H. KRENKEL.